United States Patent
Pancani et al.

(10) Patent No.: US 8,288,962 B2
(45) Date of Patent: Oct. 16, 2012

(54) HID-LAMP CONTROL METHOD AND CIRCUIT

(75) Inventors: Emanuele Pancani, Florence (IT); Filippo Vernia, La Spezia (IT)

(73) Assignee: Power-One Italy S.p.A., Arezzo (IT)

( * ) Notice: Subject to any disclaimer, the term of this patent is extended or adjusted under 35 U.S.C. 154(b) by 292 days.

(21) Appl. No.: 12/623,211

(22) Filed: Nov. 20, 2009

(65) Prior Publication Data
US 2010/0134048 A1    Jun. 3, 2010

(30) Foreign Application Priority Data

Nov. 20, 2008  (EP) ..................................... 08425738

(51) Int. Cl.
*H05B 37/02*    (2006.01)

(52) U.S. Cl. ...................... 315/307; 315/209 R; 315/308
(58) Field of Classification Search .............. 315/209 R, 315/291, 307, 308
See application file for complete search history.

(56) References Cited

U.S. PATENT DOCUMENTS

| | | | |
|---|---|---|---|
| 5,578,908 A * | 11/1996 | Persson | 315/307 |
| 6,515,882 B2 | 2/2003 | Moriguchi et al. | |
| 6,700,335 B2 * | 3/2004 | Prasad | 315/307 |
| 7,084,586 B2 * | 8/2006 | Ishihara et al. | 315/308 |
| 2006/0113922 A1 * | 6/2006 | Ribarich et al. | 315/209 R |
| 2006/0158131 A1 * | 7/2006 | Mitsuyasu et al. | 315/209 R |
| 2006/0256560 A1 * | 11/2006 | Okura | 362/265 |

FOREIGN PATENT DOCUMENTS

| | | |
|---|---|---|
| EP | 0762809 | 3/1997 |
| WO | 2006056918 | 6/2006 |

* cited by examiner

*Primary Examiner* — Tung X Le
(74) *Attorney, Agent, or Firm* — Waddey & Patterson, P.C.; Mark J. Patterson (57) ABSTRACT

A method and circuit for controlling an HID lamp powered by an HID ballast during warm-up includes gradually increasing the lamp power as the lamp voltage increases. The method includes the steps of calculating a variable reference signal as a function of the lamp voltage and controlling the lamp operating conditions based on the variable reference signal and a feedback signal, to thereby keep the lamp current within a range around a substantially constant target value during warm-up.

25 Claims, 5 Drawing Sheets

HID-LAMP CONTROL METHOD AND CIRCUIT

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference: European Patent Application No. 08425738.5, filed Nov. 20, 2008.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention concerns the control of High-Intensity Discharge ("HID") lamps. More specifically, the present invention concerns improvements to circuits and methods for enhanced control of HID lamps during the lamp warm-up phase.

HID lamps are currently broadly known and used in many different applications. HID lamps include, for example, mercury vapor lamps, high-pressure as well as low-pressure sodium vapor lamps, metal halide or ceramic metal halide lamps, and Xenon short-arc lamps.

Generally speaking, a HID lamp is a type of electrical lamp which produces light by means of an electric arc between electrodes housed inside a refractory and translucent or transparent housing constructed, for example, of fused quartz or fused alumina. Gas and metal salts are placed in the housing. After ignition of the lamp, gradual heating and evaporation of the metal salts forms a plasma in the refractory housing, which increases the light intensity of the lamp.

Following ignition, HID lamps require a warm-up phase, during which the lamp gradually heats until the electrodes reach a steady-state temperature. After ignition when the lamp is cold, the lamp voltage (the voltage across the electrodes of the lamp) is approximately 20V, while the steady-state voltage ranges approximately between 80-100 V.

To have efficient lamp management, it is necessary to have a warm-up phase of the lamp during the very first minutes after ignition. During warm-up, the lamp behaves as a resistor which changes resistance with the lamp temperature. The resistance increases with the temperature from a minimum value of approximately 6 ohms to a maximum value near 40 ohms. This behavior is linear or can be linearized between a start point and a stop point. Warm-up ends when the steady state voltage is reached. During the run-up phase, the lamp current must be limited to 1.2-1.5× the steady-state rated lamp current.

Figure 1:
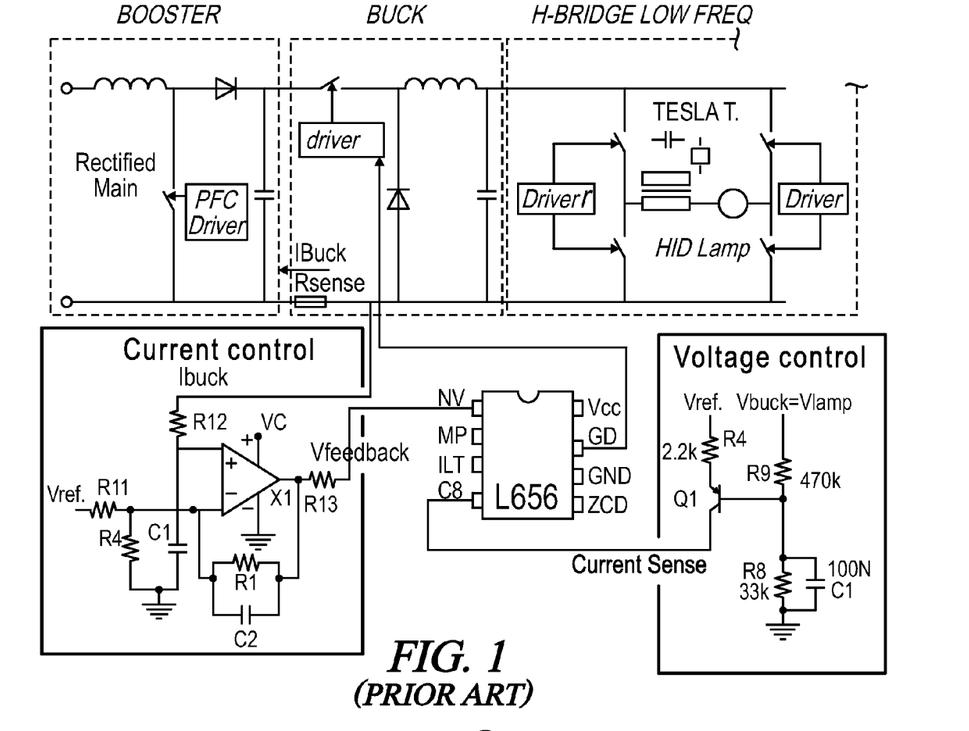
FIG. 1 shows an HID ballast according to the state of the art.
Figure 2:
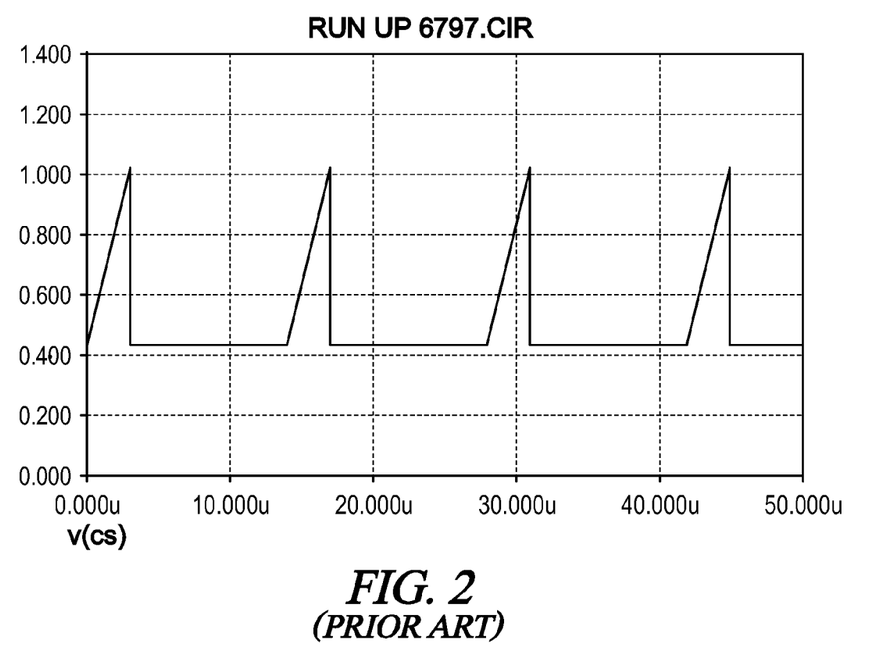
FIG. 2 shows the waveform of the buck current during the run-up phase in a ballast according to FIG. 1.

Typical HID ballasts are designed as shown in FIG. 1. The ballast includes an EMI filter and a rectifier (not shown), a booster, a buck converter and an H-bridge (full bridge) connected to the HID lamp electrodes. As shown in FIG. 1, the buck converter includes a current control circuit and a voltage control circuit, implemented with a DC-offset on the CS (current sense) pin of the PWM controller (L6562). The reason for adding the voltage control on the PWM controller is that a conventional buck converter using a simple current control would not allow reaching a required run-up current limit, and during the thermionic emission the current would increase beyond 1.2-1.5× the steady-state rated lamp current. The voltage control circuit connected to the CS pin of the PWM controller modifies the control circuit from a simple current control to a mixed "current and voltage control". During run-up, the buck current will take thus the form shown in FIG. 2. This results in a sufficient current stability during all run up phases between 20V up to 100V lamp voltage.

An electronic ballast circuit of this kind is complex and expensive. Specifically, analog circuitry to manage the warm-up phase in a typical HID ballast circuit is prone to failure and increases the cost of the circuit. Additionally, the warm-up current cannot be controlled in a reproducible manner, because it varies depending upon the lamp technology and lamp supplier, i.e. the same ballast provides different warm-up current values for different lamps. Moreover, the duration of the warm-up phase is not optimized.

Additionally, analog circuits for current control during warm-up suffer from intrinsic limitations due the manner in which the current signal is generated. As can be clearly seen in FIG. 1, the current signal is obtained by means of a current sensor (Rsense) arranged on the return line of the buck converter. Particularly during the warm-up transitional phase, the current circulating in the buck converter does not correspond to the actual current across the lamp and is variable in time as a consequence of the variable temperature conditions of the lamp. Complex measures must be implemented to correct the current sensed via the sensor resistor Rsense, so as to remove therefrom the amount of current which is circulating in the full bridge but not across the HID lamp.

Additionally, the waveform of the current circulating in the buck converter is complex and this adds to the difficulty in obtaining a current signal usable in a control loop.

Two-stage booster-buck ballasts are not the only possible devices suitable for powering HID lamps. A single-stage HID ballast is disclosed in U.S. Pat. No. 7,190,151. An HID ballast with glow arc and warm-up control is disclosed in US Patent Publication 20030222596. Similar problems as those discussed above in connection with the topology of FIG. 2 are encountered also in prior art ballasts of different kinds.

Figure 1A:
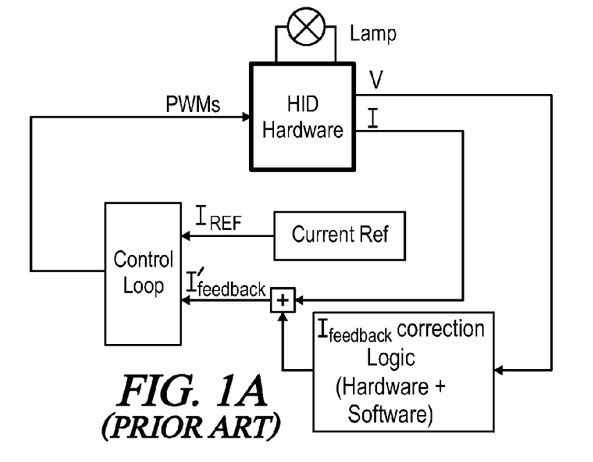
FIG. 1A shows a digitally operated circuit for HID lamp control.

FIG. 1A shows a block-diagram of a conventional warm-up control circuit using a digital microcontroller. The HID lamp control hardware (a one or two stage ballast) provides a lamp-current signal (I) and a lamp-voltage signal (V). The lamp-voltage signal is used as the feedback signal in the control loop. A correction value is added to the current feedback to generate a corrected feedback signal ($I'_{feedback}$). Such corrected feedback signal is compared in a control loop to a fixed current reference ($I_{REF}$). The correction loop generates a PWM signal to drive the HID hardware, such that the warm-up current is maintained substantially at a constant value during warm-up.

Usually a microcontroller is used to sample a lamp voltage. The sampled and digitized voltage signal is used as an index for a look-up table that contains the correction values to be added to the current feedback depending upon the actual lamp voltage. An analog correction circuit can be used, driven by corrected feedback value, or alternatively an entirely digital correction circuit is used.

Analog correction circuits and microcontroller look-up tables need to be manually adapted to work correctly and to be kept at the desired warm-up lamp current. This means that the analog circuit and/or the look-up table must be adapted to the lamp model, i.e. it is dependent upon the lamp technology, the lamp manufacturer and so on.

BRIEF SUMMARY OF THE INVENTION

The present invention provides improved methods and circuits for controlling the warm-up phase in an HID lamp, which at least partly overcome or alleviate one or more of the drawbacks of prior-art HID ballast circuits.

In some embodiments of the invention, the HID lamp control circuit includes a digital control device having a lamp-voltage input, a feedback-signal input, and a control signal output for driving the HID lamp. The digital control device is programmed to sample lamp-voltage signals during a warm-up phase, to calculate a corrected reference signal, and to compare the feedback signal and the corrected reference signal to generate a control signal to drive the HID lamp such that the lamp operating condition is modified to maintain the lamp current at a substantially constant predetermined warm-up current value.

The control loop is therefore designed to correct the reference value (to obtain a corrected, i.e. a variable or updated reference) as a function of the actual lamp temperature, because the lamp voltage is a function of the lamp temperature during warm-up. The feedback signal is not corrected as commonly done in usual control circuits and methods.

In some embodiments, the updated, i.e., the corrected reference signal is based upon a predetermined reference signal and a correction function dependent on the sampled lamp-voltage signal.

In some embodiments, the digital control device is programmed to generate a voltage-dependent correction function, based on the lamp voltage input, and to calculate the corrected reference signal summing the predetermined reference signal and the correction function.

The feedback signal can be a current signal. Such current signal can be determined by means of a current sensor, which, for example, determines a voltage signal proportional to the current flowing to the full-bridge powering the lamp.

In some embodiments, the feedback signal can be a power signal. This is simply obtained from the voltage and current values. Dependent on whether the feedback is a current or power signal, the predetermined reference signal as well as the corrected or updated reference signal is a current signal or a power signal, respectively. Comparing the feedback signal and the corrected reference generates a driving signal, e.g., a PWM signal to drive the lamp ballast. The control loop is designed to correct any error between the actual feedback signal and the corrected reference.

In some embodiments the control circuit performs the following steps:
checking whether the lamp is in a warm-up phase;
if the lamp is in a warm-up phase, sampling and digitizing a lamp-voltage value and a value which is a function of the power absorbed by the lamp;
calculating a correction function based on the lamp-voltage;
adding the correction function to a predetermined reference signal, to generate a corrected reference signal;
comparing the corrected reference signal with the feedback signal and generating a lamp driving signal to correct a mismatch between the feedback signal and the corrected reference signal;
repeating the previous steps until the lamp voltage has achieved a predetermined threshold value at which the warm-up phase is completed. At this stage the lamp is controlled in a usual manner according to a steady-state control algorithm.

In some embodiments, the lamp is powered by means of a double stage ballast, including a booster and a buck converter. In some embodiments, the signal which is a function of the lamp power is determined based on the current absorbed by the buck converter. Because the bulk voltage of the buck converter is kept constant by the booster (AC-DC converter), and because the efficiency of the buck converter is known, the power absorbed by the lamp is proportional to the current of the buck converter.

According to a further aspect, the invention also concerns an HID lighting unit including lamp terminals for an HID lamp, a lamp ballast and a control circuit as described above.

The invention also concerns a method for controlling an HID lamp during warm-up by gradually increasing the lamp power while the lamp voltage increases as a function of a lamp-temperature increase. The method includes the steps of: calculating a variable reference signal as a function of the lamp voltage, and controlling the lamp operating conditions based on the variable reference signal and a feedback signal from the lamp to keep the lamp current at a substantially constant target value during warm-up.

In actual facts, the method of the invention is based on the idea of keeping the lamp current at a substantially constant value during warm-up by adapting a reference signal at the increasing lamp voltage during warm-up. The reference signal is determined based on the actual lamp voltage. As the lamp voltage increases following warming up, the lamp feedback is compared with a variable reference signal, such that, for example, a PWM driving signal is generated, which gradually increases the lamp power by maintaining the lamp current around a pre-set value.

In some embodiments, the method includes the step of calculating the variable reference signal by adding a correction function to a predetermined reference signal, the correction function being dependent upon the lamp voltage.

In some embodiments, the method of the invention includes the step of generating a driving signal for the lamp by comparing the variable reference signal to the lamp-feedback signal and using the drive signal to control the lamp operating conditions.

In some embodiments, the method can include sampling and digitizing lamp-current and lamp-voltage values, calculating the actual lamp power from the sampled and digitized lamp-current and lamp-voltage values, determining the variable reference signal, comparing the actual lamp power and the variable reference signal, and generating a lamp driving signal from the variable reference signal and the actual lamp power.

Further embodiments and advantageous features of the method and circuit of the invention are set forth in the dependent claims and will be described in more detail here below, reference being made to the attached drawings.

DETAILED DESCRIPTION OF THE INVENTION

Figure 3:
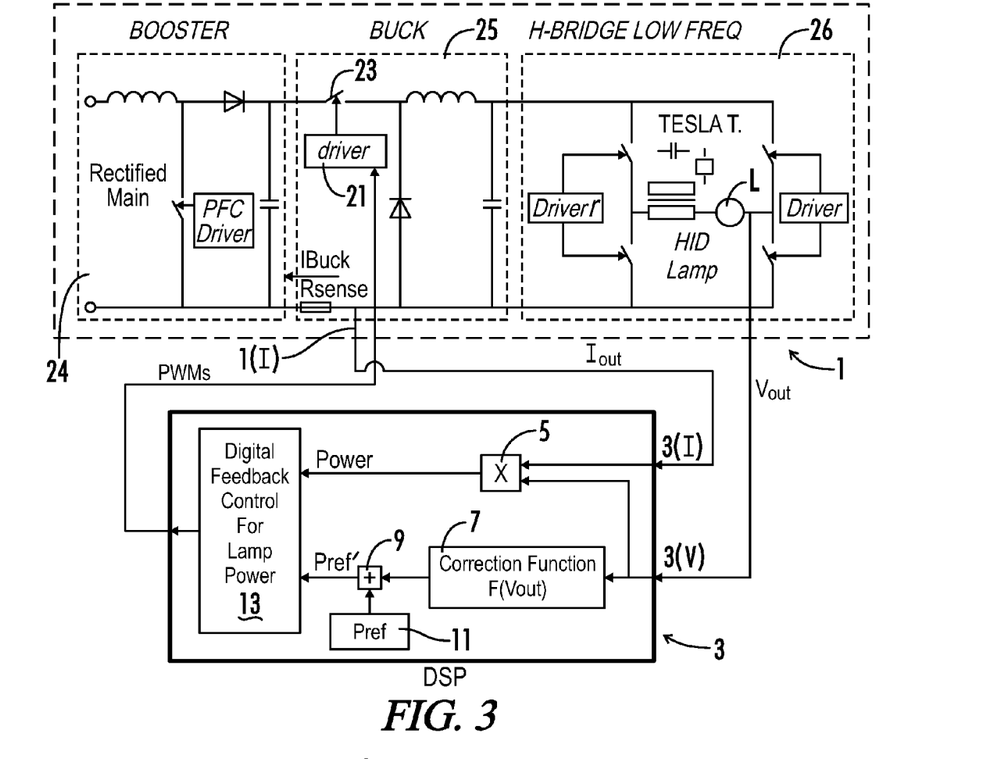
FIG. 3 is a block diagram of a digital circuit according to the present invention combined with an HID ballast.

FIG. 3 shows a block diagram of a digital control circuit and the relevant ballast for an HID lamp according to the invention. In FIG. 3, reference L indicates an HID lamp and 1 a two-stage ballast similar to the ballast shown in FIG. 1. The ballast 1 includes a booster 24, a buck converter 25 and a full bridge 26. The booster 24 provides a fixed input voltage (bulk voltage) at the input of the buck converter, which in turn powers the full bridge with an AC voltage at the desired frequency to power the lamp L. A different ballast topology could be used, as the topology in FIG. 3 is shown just by way of example.

The HID ballast 1 provides a current-value output and a voltage-value output, designated 1(V) and 1(I) respectively. The voltage output 1(V) provides the actual lamp voltage, whereas the current sensed by the current sensor resistor Rsense is actually proportional to the current flowing in the buck converter, which can differ from the actual lamp current. The current flowing in the buck converter 25 is proportional to the power absorbed by the lamp L, since the bulk voltage is constant. Knowing the actual efficiency of the buck converter, the buck current can be used to determine the actual lamp power.

A digital control device, such as a Digital Signal Processor (DSP) 3 is connected to the HID ballast 1. The DSP 3 has a voltage input terminal and a current input terminal, 3(V) and 3(I) respectively, connected to the voltage and current output terminals of the HID ballast 1. Sampling and digitizing circuits can be included in the DSP block 3, and are not shown. The circuits provide digitized samples of the current absorbed by the buck converter 25 and of the lamp voltage.

In some embodiments, functional block 5 in the DSP 3 calculates a lamp power signal, that is, a signal which is a function of the power absorbed by the lamp L. The lamp power signal is based on the actual current and voltage signals provided by the HID ballast 1. The lamp voltage signal is also applied to a correction-function block 7, which calculates a correction function F(Vout) based upon the actual lamp voltage signal (Vout). In a summing block 9, the correction function F(Vout) is summed with a pre-determined reference (Pref), provided by a reference block 8. The output of the summing block 9 is a corrected or variable reference (Pref'). The corrected (variable) reference Pref' is calculated during warm-up based on the actual lamp voltage and is used, as will be explained in more detail below, to manage the warm-up phase in an adaptive manner.

The correction function F(Vout) can be calculated in one embodiment based on a look-up table. The DSP 3 can include a storage memory where a set of F(Vout) values are stored, each corresponding to a Vout value. Alternatively or in combination, the F(Vout) correction value or correction function can be calculated based on a stored formula, e.g. based on a polynomial formula.

The corrected reference Pref' is processed in a digital feedback control block 13 and compared with the actual power signal (Power) calculated by block 5, to generate a PWM signal for the driver 21 of the electronic switch 23 of the buck converter 25 of ballast 1. The feedback PWM signal is used by the lamp drive circuit in ballast 1 to drive the lamp ballast such as to control the power absorbed by the lamp L, i.e. to control the current flowing through the lamp, such as to correct a mismatch between the corrected reference Pref' and the actual power value calculated based upon the actual the lamp voltage (Vout) and buck current (Iout).

Generally speaking, according to the invention the warm-up phase of the HID lamp L is controlled such that the lamp current is maintained approximately constant within a range of tolerance around a pre-determined warm-up current value ($I_{warm\_up}$). Because during warm-up the resistance of the lamp L as well as the voltage across the lamp L gradually increase with increasing lamp temperature, to keep the current constant (within a tolerance range) the power reference used to generate the PWM driving signal must be gradually modified as a function of the lamp temperature. The purpose of the correction function block 7 in DSP 3 is exactly that of modifying the reference power signal (Pref') by adding a variable reference value F(Vout) to a basic pre-determined power reference signal Pref, the variable reference value being a function of the actual lamp voltage.

Figure 4:
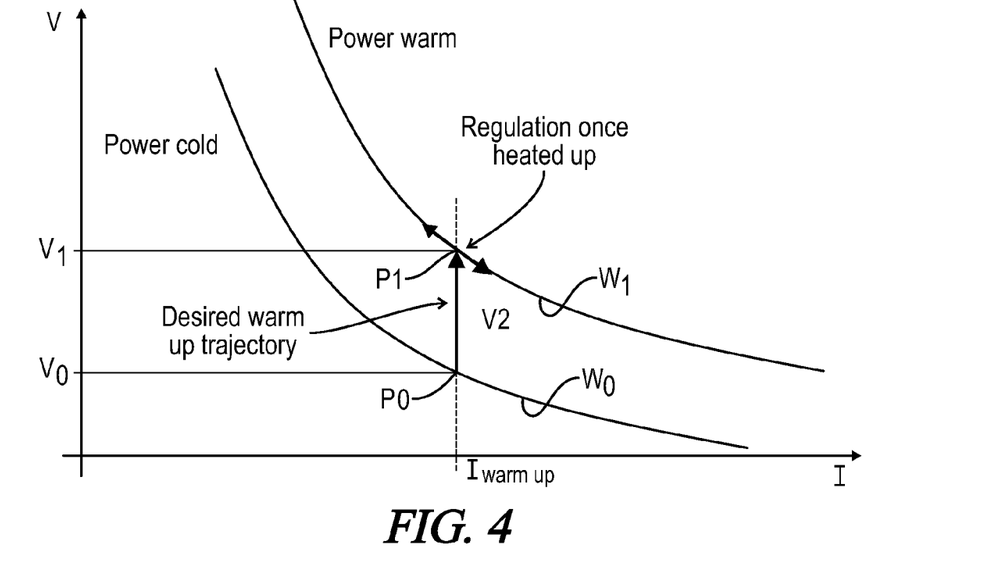
FIGS. 4 and 5 show Voltage-Current diagrams in the ideal warm-up behavior and in a real embodiment of the invention, respectively.
Figure 5:
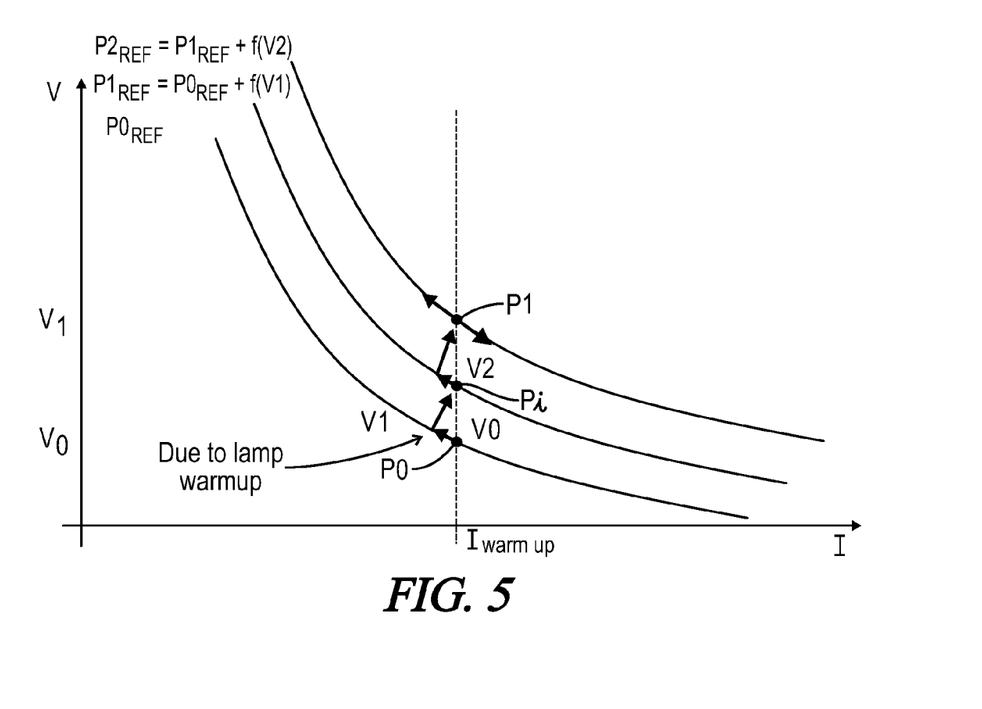

The control method according to the invention can be best understood referring to FIGS. 4 and 5. In FIG. 4 the lamp power curves are represented on a Voltage (V) vs. Current (I) diagram, the current (I) being reported on the abscissa and the voltage (V) on the ordinate.

Theoretically, the warm-up phase is managed by keeping the lamp current at a constant value $I_{warm\_up}$, as shown in FIG. 4. The desired warm-up trajectory would then be represented by a straight vertical line (constant lamp current) starting from a point $P_0$, which corresponds to the lamp voltage ($V_0$) at the beginning of the warm-up phase and ending at point $P_1$, corresponding to the lamp voltage value ($V_1$) at which the warm-up phase is considered concluded, e.g. a value ranging between 50 and 100 V, such as 60 V, for example. After the lamp L has reached the $V_1$ voltage, the circuit will switch to the usual steady-state lamp management.

$W_0$ and $W_1$ represent the power curves corresponding to points $P_0$ and $P_1$ in the I-V diagram of FIG. 3. It is clear from this diagram, therefore, that during warm-up the power (W=V*I) shall be gradually increased from $W_0$ to $W_1$ to keep the $I_{warm\_up}$ current constant, i.e. within a certain range of variation around a constant target value. This requires a gradual increase of the power-reference signal. This is achieved according to the control loop described above, by modifying the power reference Pref.

In a real implementation of the above described approach, because the lamp temperature increase will cause a corresponding voltage increase and thus a reduction of the lamp current, absent any counter-measure to keep the current around the desired constant value $I_{warm\_up}$, the current would gradually decrease starting from $I_{warm\_up}$ along the actual power curve. Starting from point $P_0$, for example, the current would gradually decrease along the $W_0$ curve as a result of the lamp warming up.

The object of the variable power-reference signal generated at summing block 9 of the DSP 3 is to force the circuit to move from curve $W_0$ to an intermediate curve $W_1$ as shown in the diagram of FIG. 5 and maintaining in this way the lamp current within a certain range around the target value $I_{warm\_up}$. Thus, starting from a predetermined or pre-set power reference value Pref, the DSP 3 calculates the updated or corrected power reference Pref') based on the actual lamp voltage. The updated variable power reference Pref' is then compared with the actual power (W=I*V) (block 11 in FIG. 3), absorbed by the lamp L and a PWM signal is generated to drive the lamp L such that the lamp current is again brought to the target warm-up current value $I_{warm\_up}$.

This process can be iteratively repeated during the whole warm-up phase, until the final voltage $V_1$ has been reached, at which point the circuit switches to a usual steady-state control procedure. This means that the circuit is actually moved stepwise from the first to the last characteristic curve W (starting from $W_0$ and ending at $W_1$) through a desired number of intermediate steps. The number of steps depend on the frequency at which the iterative control algorithm is performed to correct the reference value Pref'. During steady state, the DSP 3 maintains the lamp power constant, according to usual control methods.

The result of the warm-up control method is to keep the current constant (within a certain range around the target value $I_{warm\_up}$) during the warm-up phase and to have a warm-up phase characterized by a power ramp, using the lamp voltage (Vout) as the input for the control loop.

The starting power value $W_0$, after ignition of the lamp, corresponds to a predetermined power reference corresponding to the minimum power applied. For example, a 70 W starting power value ($W_0$) can be applied for a 250 W lamp. The warm-up digital control performed by the DSP 3 locks the output lamp voltage when it reaches a pre-defined value, for example 20V for a 250 W lamp. This behavior defines the lamp current value $I_{warm\_up}$ that will be kept constant during the whole warm-up phase as follows $$I_{warm-up} = \frac{P_0}{V_0}$$
$$P_0 = 70 \text{ W}$$
$$V_0 = 20 \text{ V}$$
$$\Rightarrow I_{warm-up} = \frac{70 \text{ W}}{20 \text{ V}} = 3.5A$$

This guarantees that the warm-up current is almost the same for every lamp, irrespective of the lamp technology or lamp manufacturer.

From this initial point, the warm-up control algorithm computes a correction value using the output voltage measure. This can be seen as an automatic dimming control of the lamp L, which is enabled only during the warm-up phase. The process ends when the output voltage reaches a threshold voltage value for which the lamp can be considered "warmed", for example 60V for a 250 W lamp.

Figure 6:
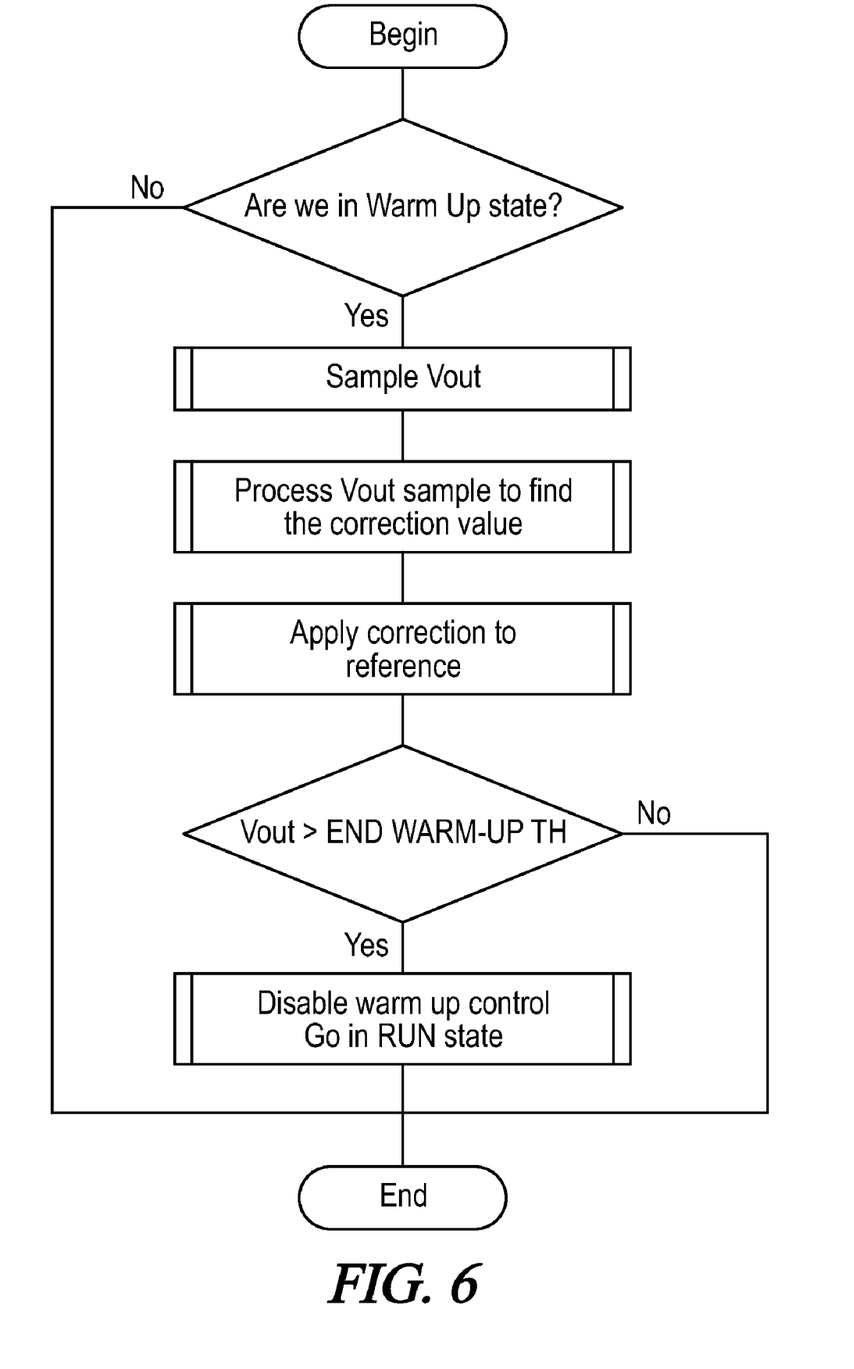
FIG. 6 shows a flow chart showing the digital warm-up control according to the present invention.

The above described control method is summarized in one embodiment by the flow chart in FIG. 6, which shows the following steps:
  the DSP 3 checks if the lamp is in a warm-up state, e.g. by comparing the actual voltage value on the voltage input 3(V) with a threshold voltage value, above which the lamp is considered as having completed the warmed-up phase,
  if the lamp is in the warm-up state, the DSP 3 samples the lamp voltage,
  the DSP 3 computes a correction value F(Vout) as a function of the sampled lamp voltage,
  the DSP 3 computes a corrected reference value Pref) based on the predetermined reference value Pref using the correction value F(Vout),
  the corrected variable reference value (Pref) and the actual power absorbed by the lamp (calculated as a product of the sampled lamp voltage and buck current) is compared with the corrected variable reference value,
  a PWM signal is generated, as a feedback, which acts on the HID ballast 1 to modify the lamp power to correct the error between actual lamp power and Pref, and
  the warm-up phase terminates when the DSP 3 measures a lamp voltage equal to or higher than a defined threshold (TH), e.g. 60 V.

Figure 3A:
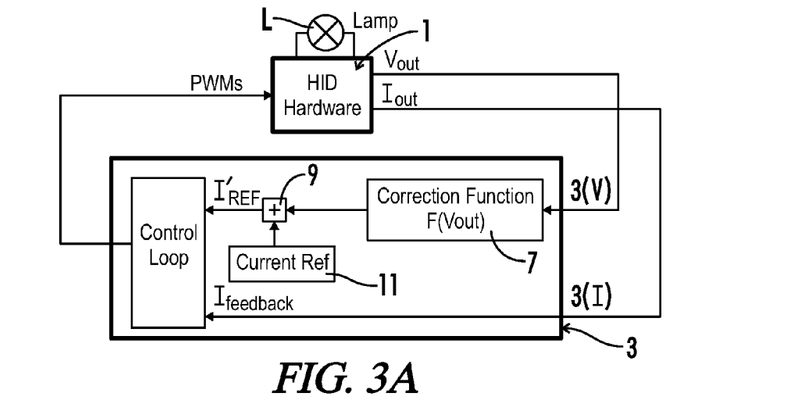
FIG. 3A is a block diagram of a digital circuit according to the present invention in a modified embodiment.

FIG. 3A shows a block diagram similar to the one of FIG. 3, wherein the reference signal is a current signal rather than a power signal. The operating principle of this circuit is the same as disclosed above in connection with the circuit of FIG. 3.

The main difference between the method and device according to the invention and the prior art methods and devices is that the method of the invention is based on an "adaptive" algorithm. After the main parameters such as warm-up current, starting power and final voltage have been set (the starting voltage being determined by the warm-up current and starting power), the algorithm will vary the power reference such as to maintain the lamp current substantially constant, irrespective of the lamp technology or lamp provider. Substantially constant shall be intended as constantly within an acceptable range of variability around a predetermined value. The set-point is thus defined a priori and the feedback current is not changed, but it is rather the current actually absorbed by the buck converter stage of the ballast, which is increased. In analog control systems, conversely, a default offset is added to the feedback used for power control. The default offset is corrected based on the lamp voltage. In that case the resulting feedback signal does not follow the actual current which flows in the sensing element.

Bench tests report that the novel approach increases warm-up reliability generating a warm-up current that is less sensitive to the lamp parameters, i.e. lamp manufacturing technology and lamp suppliers. This allows the device to have a good warm-up control independently of the lamp type or lamp supplier.

Moreover having a predefined warm-up set point speeds up the warm-up phase, which is beneficial for the end user, because the lamp can always work at the maximum current allowed for this state. Indeed, because the warm-up phase is carried out at a constant lamp current (about 1.4-1.5 times the nominal current) the nominal power can be reached as fast as possible without damaging the lamp or causing light flickering effects. In addition to the shortening of the warm-up phase, the method according to the invention also results in an increased average lamp life time.

Thus, although there have been described particular embodiments of the present invention of a new and useful HID-Lamp Control Method and Circuit, it is not intended that such references be construed as limitations upon the scope of this invention except as set forth in the following claims.

What is claimed is:

1. An HID lamp control circuit comprising:
  a digital control device having a lamp-voltage input, a feedback-signal input, and a control signal output for driving the HID lamp; and
  wherein the digital control device is programmed to
    sample lamp-voltage signals during a warm-up phase, calculate a corrected reference signal,
    compare the feedback signal and the corrected reference signal to generate a control signal to drive the HID lamp such that the lamp operating condition is modified to maintain the lamp current within a range around a substantially constant predetermined warm-up current value.

2. The control circuit according to claim 1, wherein the corrected reference signal is based upon a predetermined reference signal and a correction function dependent on the sampled lamp-voltage signal.

3. The control circuit according to claim 2, wherein the digital control device is programmed to provide a voltage-dependent correction function, based on the lamp-voltage input, and to calculate the corrected reference signal combining the predetermined reference signal and the correction function.

4. The control circuit according to claim 3, wherein the feedback signal is a signal indicative of the power absorbed by the lamp.

5. The control circuit according to claim 2, wherein the digital control device is a digital signal processor.

6. The control circuit according to claim 2, wherein the feedback signal is a signal indicative of the power absorbed by the lamp.

7. The control circuit according to claim 1, wherein the digital control device is programmed to provide a voltage-dependent correction function, based on the lamp-voltage input, and to calculate the corrected reference signal combining the predetermined reference signal and the correction function.

8. The control circuit according to claim 7, wherein the digital control device is a digital signal processor.

9. The control circuit according to claim 7, wherein the feedback signal is a signal indicative of the power absorbed by the lamp.

10. The control circuit according to claim 1, wherein the digital control device is a digital signal processor.

11. The control circuit according to claim 1, wherein the feedback signal is a signal indicative of the power absorbed by the lamp.

12. The control circuit according to claim 1, wherein the digital control device is programmed to perform the following steps:
   (a) checking whether the lamp is in a warm-up phase;
   (b) if the lamp is in a warm-up phase, sampling and digitizing a lamp-voltage value and a lamp-power value;
   (c) calculating a correction function based on the lamp voltage;
   (d) adding the correction function to a predetermined reference signal, to generate a corrected reference signal;
   (e) comparing the corrected reference signal with the feedback signal and generating a lamp driving signal to correct a mismatch between the feedback signal and the corrected reference signal; and
   (f) repeating steps (a) to (e) until the lamp voltage has achieved a predetermined threshold value at which the warm-up phase is completed.

13. The circuit of claim 1 further comprising an HID lighting unit including terminals for an HID lamp and a lamp ballast.

14. A method for controlling an HID lamp during warm-up comprising the steps of:
   gradually increasing lamp power as lamp voltage increases;
   calculating a variable reference signal as a function of the lamp voltage;
   controlling lamp operating conditions based on the variable reference signal and on a feedback signal, to keep lamp current within a range around a substantially constant target value during warm-up; and
   calculating the variable reference signal by applying a correction function to a predetermined reference signal, the correction function being dependent upon the lamp voltage.

15. The method of claim 14, further comprising the step of generating a drive signal for the lamp by comparing the variable reference signal to the feedback signal and using the drive signal to control the lamp operating conditions.

16. The method of claim 15, wherein the feedback signal is a signal function of the power absorbed by the lamp.

17. The method of claim 15, wherein the variable reference signal and the predetermined reference signal are current signals or power signals.

18. The method of claim 14, further comprising the step of generating a drive signal for the lamp by comparing the variable reference signal to the feedback signal and using the drive signal to control the lamp operating conditions.

19. The method of claim 18, wherein the variable reference signal and the predetermined reference signal are current signals or power signals.

20. The method of claim 14, wherein the feedback signal is a signal function of the power absorbed by the lamp.

21. The method of claim 14, wherein the feedback signal is a signal function of the power absorbed by the lamp.

22. The method of claim 14, wherein the variable reference signal and the predetermined reference signal are current signals or power signals.

23. The method of claim 14, wherein the variable reference signal and the predetermined reference signal are current signals or power signals.

24. A method for controlling an HID lamp during warm-up comprising the steps of:
   gradually increasing lamp power as lamp voltage increases:
   calculating a variable reference signal as a function of the lamp voltage;
   controlling lamp operating conditions based on the variable reference signal and on a feedback signal, to keep lamp current within a range around a substantially constant target value during warm-up;
   sampling and digitizing lamp-voltage values and values of an electric parameter proportional to the lamp power;
   calculating actual lamp power;
   determining the variable reference signal;
   comparing the actual lamp power and the variable reference signal; and
   generating a lamp drive signal from the variable reference signal and the actual lamp power.

25. A method for controlling an HID lamp during warm-up comprising the steps of:
   gradually increasing lamp power as lamp voltage increases;
   calculating a variable reference signal as a function of the lamp voltage;
   controlling lamp operating conditions based on the variable reference signal and on a feedback signal, to keep lamp current within a range around a substantially constant target value during warm-up;
   (a) checking whether the lamp is in a warm-up phase;
   (b) if the lamp is in a warm-up phase, sampling and digitizing a lamp-voltage value and a lamp-power value;
   (c) calculating a correction function based on the lamp-voltage;
   (d) adding the correction function to a predetermined reference signal, to generate a corrected reference signal;
   (e) comparing the corrected reference signal with the feedback signal and generating a lamp driving signal to correct a mismatch between the feedback signal and the corrected reference signal; and
   (f) repeating steps (a) to (e) until the lamp voltage has achieved a predetermined threshold value at which the warm-up phase is completed.

* * * * *